(12) United States Patent
Sako

(10) Patent No.: US 6,967,797 B2
(45) Date of Patent: Nov. 22, 2005

(54) WRITE DRIVER CIRCUIT FOR DRIVING A MAGNETIC HEAD

(75) Inventor: Michiya Sako, Kagoshima (JP)

(73) Assignee: Sony Corporation (JP)

( * ) Notice: Subject to any disclaimer, the term of this patent is extended or adjusted under 35 U.S.C. 154(b) by 195 days.

(21) Appl. No.: 10/390,786

(22) Filed: Mar. 19, 2003

(65) Prior Publication Data

US 2003/0179480 A1 Sep. 25, 2003

(30) Foreign Application Priority Data

Mar. 20, 2002 (JP) ...................................... P2002-078869

(51) Int. Cl.[7] .............................. G11B 5/09; G11B 5/02
(52) U.S. Cl. .............................. 360/46; 360/67; 360/68; 360/31; 360/60; 360/61; 327/108; 327/124; 327/132; 327/423
(58) Field of Search ........................ 360/46, 31, 66–69, 360/39, 55, 60–61, 51; 327/108, 100, 110, 124, 132, 365, 423, 103

(56) References Cited

U.S. PATENT DOCUMENTS

| | | | | | |
|---|---|---|---|---|---|
| 5,287,231 A | * | 2/1994 | Shier et al. | ................... | 360/68 |
| 5,822,141 A | * | 10/1998 | Chung et al. | ................. | 360/46 |
| 6,215,607 B1 | * | 4/2001 | Ngo | .............................. | 360/46 |
| 6,236,246 B1 | * | 5/2001 | Leighton et al. | ............ | 327/110 |
| 6,429,987 B1 | * | 8/2002 | Cheng | .......................... | 360/46 |
| 6,496,317 B2 | * | 12/2002 | Lacombe | ...................... | 360/68 |

FOREIGN PATENT DOCUMENTS

JP          2001-101608          * 4/2001

* cited by examiner

*Primary Examiner*—David Hudspeth
*Assistant Examiner*—Natalia Figueroa
(74) *Attorney, Agent, or Firm*—Rader, Fishman & Grauer PLLC; Ronald P. Kananen

(57) ABSTRACT

A write driver circuit for driving a magnetic head applicable to a variety of magnetic heads or magnetic storage media is disclosed. The circuit includes a write current generating section for generating plural types of write current for magnetizing a predetermined area of a magnetic storage medium in a predetermined direction; a switching signal generating section for generating a switching signal for switching among the write currents; a switching section for changing the direction of magnetization through the magnetic head by switching among the write currents based on the switching signal; and an overshoot current generating section for generating an overshoot current for instantaneously increasing the write current when the direction of magnetization is changed by the switching section; wherein the circuit further includes an overshoot current generation signal producing section, and is designed so that the overshoot current is generated based on an overshoot current generation signal produced thereby.

10 Claims, 4 Drawing Sheets

WRITE DRIVER CIRCUIT FOR DRIVING A MAGNETIC HEAD

CROSS REFERENCES TO RELATED APPLICATIONS

The present invention claims priority to its priority document No. 2002-078869 filed in the Japanese Patent Office on Mar. 20, 2002, the entire contents of which are incorporated by reference herein.

BACKGROUND OF THE INVENTION

1. Field of the Invention

The present invention relates to a write driver circuit for driving a magnetic head and a hard disk apparatus incorporating the same.

2. Description of the Related Art

In recent years, storage devices using magnetic storage media, such as hard disks, are becoming more and more popular as one of storage devices for storing a large volume of data along with the widespread use of computers. In these magnetic storage devices, a write operation into a magnetic storage medium is accomplished by supplying a write current, which corresponds to data to be stored and which is generated by a write driver circuit for driving a magnetic head, to a magnetic head placed in close proximity to the magnetic storage medium, to thereby magnetize a predetermined storage area of the magnetic storage medium in a predetermined direction by the magnetic head.

One conventional popular example of the write driver circuit for driving a magnetic head is one that instantaneously increases (overshoots) the write current by instantaneously superposing an overshoot current onto the write current only when the direction of magnetization is changed. The reason why the write current is overshot at the time of changing the direction of magnetization is that it is advantageous in ensuring correct magnetization of the storage area in the magnetic storage medium immediately after the current supply to the magnetic head, which successfully clarifies the timing when the direction of magnetization is changed, and improves jitter characteristics when stored data is read from the magnetic storage medium. An exemplary configuration of the circuit is shown in FIG. 4.

A conventional write driver circuit 100 for driving a magnetic head shown in FIG. 4 includes a write current generating section 104 for generating two types of write current (write current for normal rotation and write current for reverse rotation) to be applied to a magnetic head 103 based on write driver control signals 101, 102, a switching signal generating section 107 for generating switching signals 105, 106 for selecting either one of the two write currents, a switching section 108 for switching the write currents according to the switching signals 105, 106, and an overshoot current generating section 109 for generating an overshoot current for instantaneously increasing the write current when the direction of magnetization is changed.

The overshoot current generating section 109 is designed to generate an overshoot current according to voltage changes in the switching signals 105, 106 generated by the switching section 108 when the direction of magnetization is changed, and to output the thus generated overshoot current towards the write current generating section 104. This allows the write driver circuit 100 for driving a magnetic head to supply a write current having superposed thereon the overshoot current from the write current generating section 104 to the magnetic head 103.

As described in the above, the conventional write driver circuit 100 for driving a magnetic head is configured so that the overshoot current generating section 109 generates the overshoot current based on the voltage changes in the switching signals 105, 106 used for switching the write current in the switching section 108.

As a consequence, the current value of the overshoot current generated by the overshoot current generating section 109 is determined by the voltage level of the switching signals 105, 106, the capacity of capacitors 114, 115, the resistance of resistors 112, 113, and so forth, and is thus always keep at a constant value.

That is, the conventional write driver circuit 100 for driving a magnetic head is configured so as to allow the overshoot current generating section 109 to generate the overshoot current always at a constant level when the direction of magnetization is changed by the switching section 108, and to allow such constant overshoot current to be output towards the write current generating section 104 to thereby instantaneously increase the write current generated therein.

The conventional write driver circuit 100 for driving a magnetic head is, however, disadvantageous in that the current value of the overshoot current is always kept constant while being governed by the voltage level of the switching signals 105, 106, the capacity of the capacitors 114, 115 and so forth, which makes it difficult to conveniently apply the circuit to plural types of magnetic heads or magnetic storage media. In other words, since magnetic heads or magnetic storage media differ individually from each other according to their materials and electrical properties, and as a consequence, differ significantly with each other in optimum values for the overshoot current, a circuit having only a single constant value for the overshoot current is not applicable to the entire range of the magnetic heads or magnetic storage media.

In particular, since the conventional write driver circuit 100 for driving a magnetic head described above is designed to generate the overshoot current based on voltage changes in the switching signals 105, 106 used for switching the write current in the switching section 108, it is fairly difficult to apply the circuit to plural kinds of magnetic heads or magnetic storage media. This is because an allowable range for the voltage changes in the switching signals 105, 106 should fall within a predetermined range given by a circuit configuration of the switching section 108, so that the generation of the overshoot current based on voltage changes in the switching signals 105, 106 inevitably limits the variable range of the overshoot current, which makes it difficult to conveniently apply the circuit to a variety of magnetic heads or magnetic storage media.

SUMMARY OF THE INVENTION

One possible solution for this drawback may relate to use of a circuit configuration for increasing or decreasing the overshoot current, which can be achieved by selectively employing a variable capacitance configuration of the capacitors 114, 115 in the overshoot current generating section 109 or by inserting resistors on both sides of the capacitors 114, 115. This, however, requires precise fabrication of a plurality of resistors and capacitors on a semiconductor substrate, so that there has been apprehension about a dimensional expansion of the semiconductor devices and increasing production costs.

A first aspect of the present invention is directed to provide a write driver circuit for driving a magnetic head.

The write driver circuit for a magnetic head includes: a write current generating section for generating plural types of write current to magnetize through a magnetic head a predetermined area of a magnetic storage medium in a predetermined direction; a switching signal generating section for generating a switching signal for switching among the plural types of write current generated by the write current generating section; a switching section for changing the direction of magnetization through the magnetic head by switching among the plural types of write current based on the switching signal generated by the switching signal generating section; and an overshoot current generating section for generating an overshoot current for instantaneously increasing the write current when the direction of magnetization is changed by the switching section. The write driver circuit for driving a magnetic head further includes an overshoot current generation signal producing section in addition to the switching signal generating section, and the overshoot current is generated based on an overshoot current generation signal produced by the overshoot current generation signal producing section.

In the write driver circuit for driving a magnetic head according to the first aspect of the present invention, the overshoot current generation signal producing section may be configured so as to control the voltage of the overshoot current generation signal in order to increase or decrease the overshoot current.

The write driver circuit for a magnetic head according to the present invention is such that for generating write current to be supplied to a magnetic head placed in close proximity to the magnetic storage medium and has a write current generating section for generating plural types of write current to magnetize through a magnetic head a predetermined area of a magnetic storage medium in a predetermined direction; a switching signal generating section for generating a switching signal for switching among the plural types of write current generated by the write current generating section; a switching section for changing the direction of magnetization through the magnetic head by switching among the plural types of write current based on the switching signal generated by the switching signal generating section; and an overshoot current generating section for generating an overshoot current to instantaneously increase the write current when the direction of magnetization is changed by the switching section.

The write driver circuit for driving a magnetic head according to the first aspect of the present invention further includes an overshoot current generation signal producing section in addition to the switching section, and allows such overshoot current generation signal producing section to produce an overshoot current generation signal in addition to the switching signal of the switching section.

By producing the overshoot current based on the overshoot current generation signal that is provided in addition to the switching signal generated by the switching signal generating section, the voltage variable range of the overshoot current generation signal, which serves as a reference for generating the overshoot current, can be liberated from being restricted by the circuit configuration of the switching section. This expands the flexibility of such voltage variable range of the overshoot current generation signal, and thus makes it possible to provide a write driver circuit for a magnetic head which is conveniently be applicable to a variety of magnetic heads or magnetic storage media.

In particular, for the case where the circuit is designed to increase or decrease the overshoot current by controlling the voltage of the overshoot current generation signal by the overshoot current generation signal producing section, only a simple circuit configuration will be sufficient for precisely increasing or decreasing the overshoot current. This makes it possible to provide a write driver circuit for driving a magnetic head which is conveniently applicable to a variety of magnetic heads or magnetic storage media without causing any dimensional expansion of the semiconductor devices and increasing production costs.

A second aspect of the present invention is directed to provide a hard disk apparatus including a write driver circuit for driving a magnetic head. The write driver circuit for driving a magnetic head includes: a write current generating section for generating plural types of write current to magnetize through a magnetic head a predetermined area of a magnetic storage medium in a predetermined direction; a switching signal generating section for generating a switching signal for switching among said plural types of write current generated by said write current generating section; a switching section for changing the direction of magnetization through said magnetic head by switching among said plural types of write current based on said switching signals generated by said switching signal generating section; and an overshoot current generating section for generating an overshoot current for instantaneously increasing said write current when the direction of magnetization is changed by said switching section; wherein the write driver circuit for driving a magnetic head further comprises an overshoot current generation signal producing section in addition to the switching signal generating section, and the overshoot current is generated based on an overshoot current generation signal produced by the overshoot current generation signal producing section.

In the hard disk apparatus according to the second aspect of the present invention, an overshoot current generation signal producing section is configured so as to control the voltage of the overshoot current generation signal in order to increase or decrease the overshoot current.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION OF THE PREFERRED EMBODIMENTS

Specific embodiments of the present invention will be detailed below referring to the attached drawings.

A write driver circuit 1 for driving a magnetic head according to the present embodiment is such that for generating write current to be applied to a magnetic head 2 placed in close proximity to a magnetic storage medium. The write driver circuit 1 for driving a magnetic head is designed to generate two kinds of write current for normal rotation and reverse rotation according to the direction (normal direction and reverse direction) which makes a predetermined storage area of the magnetic storage medium magnetize.

Figure 1:
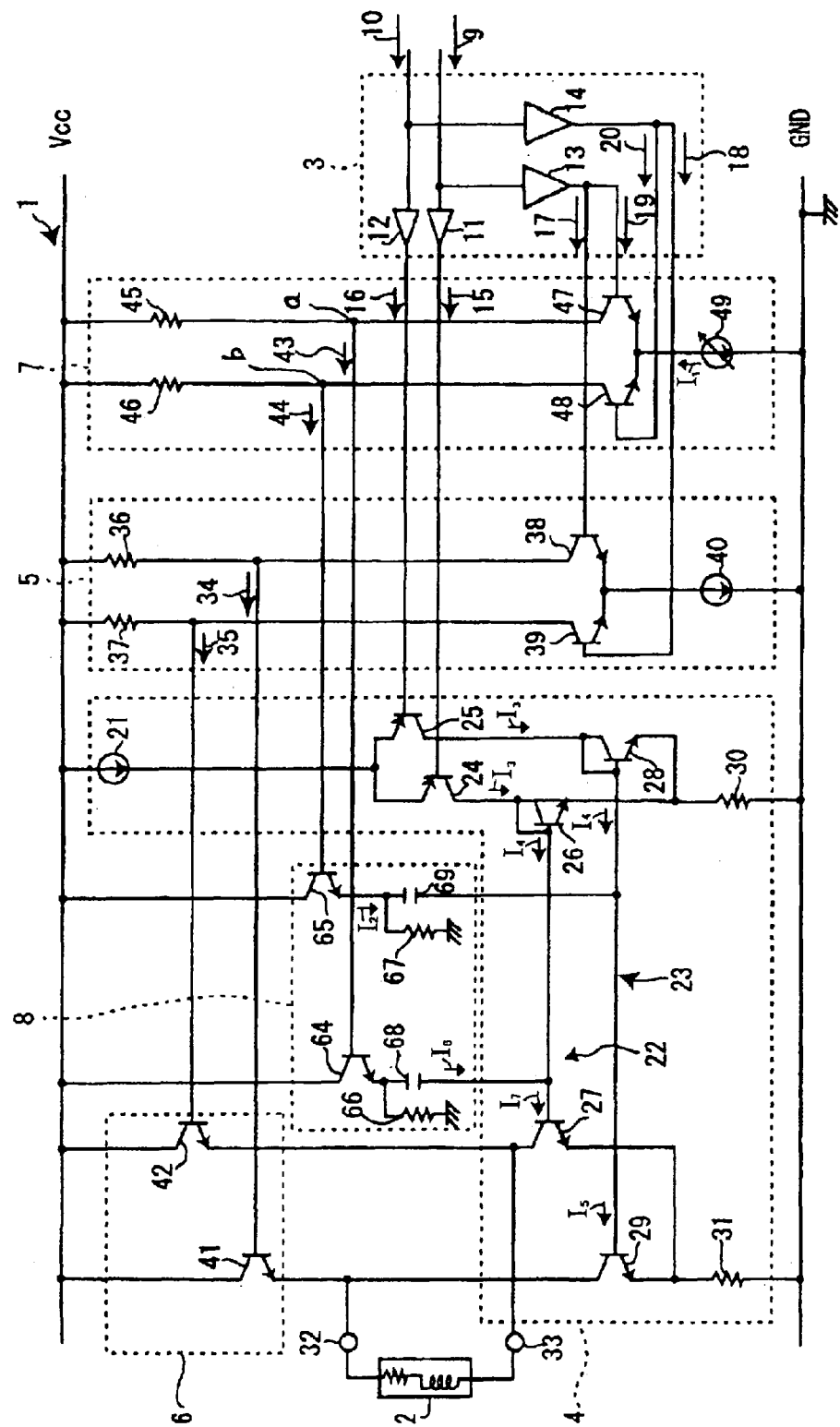
FIG. 1 is a circuit diagram of a write driver circuit for driving a magnetic head according to the present embodiment.

The write driver circuit 1 for driving a magnetic head 2 shown in FIG. 1 has six circuit blocks, which include a control signal separation section 3, a write current generating section 4, a switching signal generating section 5, a switching section 6, an overshoot current generation signal producing section 7, and an overshoot current generating section 8.

Specific configuration of the individual circuit blocks will be explained below.

The control signal separation section 3 is a circuit block responsible for separating, via buffer amplifiers 11 to 14, a pair of write driver control signals 9, 10, which correspond to data to be stored in the magnetic storage medium, into write current generation control signals 15, 16, switching control signals 17, 18, and overshoot current generation control signals 19, 20. The write driver control signals 9, 10 are input control signals for the write driver circuit 1 for driving a magnetic head. When the write driver control signal 9 has a higher voltage level than the other write driver control signal 10, a write current for normal rotation is supplied to the magnetic head 2 so as to magnetize a storage area of the magnetic storage medium in the direction of normal rotation. For the case contrary to this, a write current for reverse rotation is supplied to the magnetic head 2 so as to magnetize a storage area of the magnetic storage medium in the direction of reverse rotation.

The write signal generating section 4 is a circuit block responsible for generating two kinds of write current (write current for normal rotation and write current for reverse rotation) to be supplied to the magnetic head 2 according to the pair of write current generation control signals 15, 16, (write driver control signals 9, 10).

In the write signal generating section 4, parallel lines of two current mirror circuits 22, 23 for current amplification are connected to a constant-current circuit 21 while respectively placing switching transistors 24, 25 in between. The write current generation control signals 15, 16 are connected to the switching transistors 24, 25 respectively. The current mirror circuits 22, 23 include a pair of transistors 26, 27, another pair of transistors 28, 29 and resistors 30, 31.

The write current generating section 4 is designed to effect switching control of the switching transistors 24, 25 using the write current generation control signals 15, 16 so as to bring either one of the switching transistors 24, 25 into ON status, and outputs the write current only from the current mirror circuits 22, 23 connected to the switching transistors 24, 25 already brought into the ON status. The write current is output from either of the current mirror circuits 22, 23 towards connection terminals 32, 33 provided for connection to the magnetic head 2, where the write current for normal rotation is output from the current mirror circuit 22 to the connection terminal 32, and the write current for reverse rotation is output from the current mirror circuit 23 to the connection terminal 33.

The switching signal generating section 5 is a circuit block responsible for generating switching signals 34, 35 for switching to, based on the switching control signals 17, 18 (write driver control signals 9, 10), to either one of two write currents generated by the write current generating section 4.

In the switching signal generating section 5, parallel lines of two kinds of resistors 36, 37 and two kinds of switching transistors 38, 39 are connected to a constant-current circuit 40, where the switching transistors 38, 39 are controlled by the switching control signals 17, 18, respectively, so as to generate two kinds of switching signals 34, 35.

The switching section 6 is a circuit block responsible for changing the direction of magnetization effected by the magnetic head 2, which is accomplished by switching to either one of two write currents while being controlled by the switching signals 34, 35 generated by the switching signal generating section 5.

The switching section 6 includes two parallel lines of switching transistors 41, 42, where either one of which is selected by the switching signals 34, 35 to be brought into ON status, and the write current is supplied only to either one of the connection terminals 32, 33 connected to either one of switching transistors 41, 42 already brought into the ON status.

The overshoot current generation signal producing section 7 is a circuit block responsible for generating, based on the overshoot current generation control signals 19, 20 (write driver control signals 9, 10), overshoot current generation signal 43, 44 for switching to either one of two overshoot currents generated by the overshoot current generating section 8 described later.

In the overshoot current generation signal producing section 7, parallel lines of two kinds of resistors 45, 46 and two kinds of switching transistors 47, 48 are connected to a variable-current circuit 49, where the switching transistors 47, 48 are switched, controlled by the overshoot current generation control signals 19, 20, respectively, so as to generate two kinds of overshoot current generation signals 43, 44.

The overshoot current generation signal producing section 7 is designed capable of adjusting supply current into four levels at the variable-current circuit 49 as described later, and thus it can produce four levels of overshoot current generation signals 43, 44 according to the supply current thus adjusted by the variable-current circuit 49. In other words, the voltages of the overshoot current generation signals 43, 44 are controllable through adjusting the supply current at the variable-current circuit 49.

Figure 2:
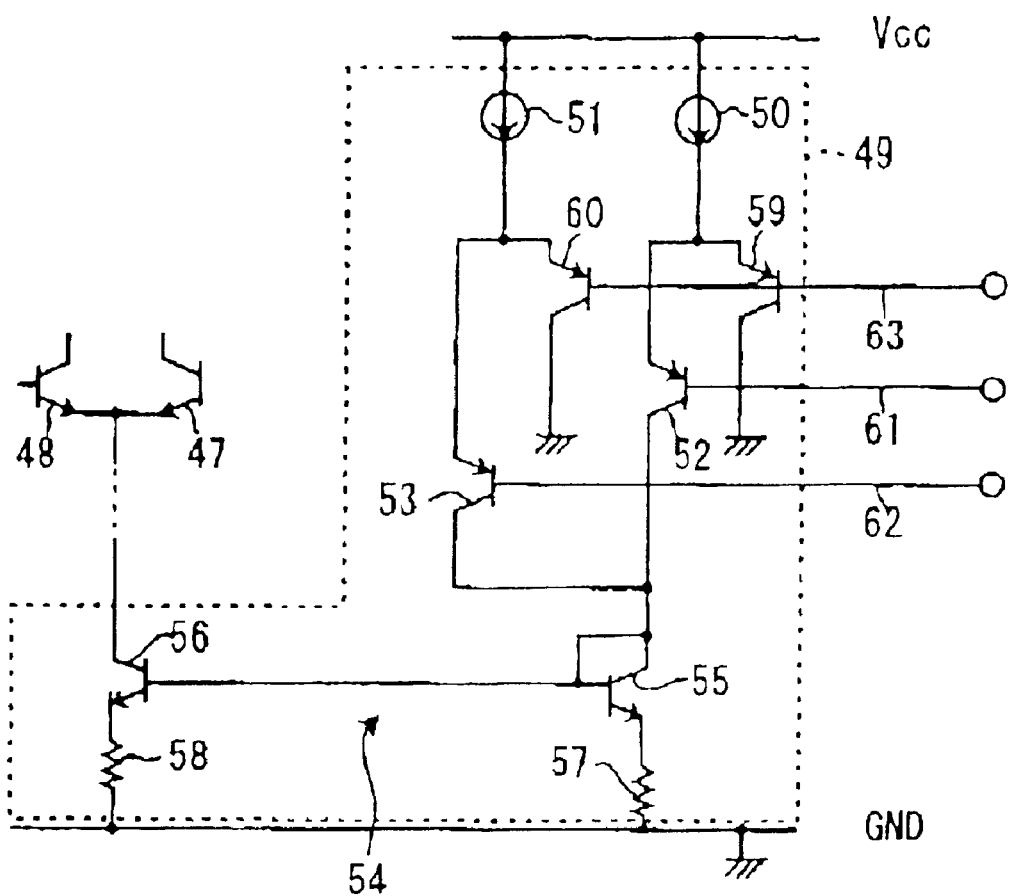
FIG. 2 is a circuit diagram of a variable current circuit.

The variable-current circuit 49 is specifically configured as shown in FIG. 2, in which two different constant-current circuits 50, 51 arranged in parallel are individually connected with switching transistors 52, 53, and a current mirror circuit 54 is connected to the output sides of such switching transistors 52, 53. The current mirror circuit 54 includes a pair of transistors 55, 56 for input/output and resistors 57, 58. Reference numerals 59, 60 in the drawing denote reference switching transistors.

In the variable-current circuit 49, the switching transistors 52, 53 are connected so as to be respectively switched by overshoot current adjustment signals 61, 62; and the reference switching transistors 59, 60 are connected to receive reference signal 63.

Thus, the variable-current circuit 49 can supply four levels of predetermined electric currents to the transistor 56 on the output side based on switching control of the switching transistors 52, 53, 59, 60 using the overshoot current adjustment signals 61, 62 and reference signal 63.

More specifically, (1) for the case where both of the overshoot current adjustment signals 61, 62 have higher voltage levels than that of the reference signal 63, both switching transistors 52, 53 are brought into ON status, which allows a summation of currents determined by the constant-current circuits 50 and 51 to be supplied to the transistor 56 on the output side; (2) for the case where only the overshoot current adjustment signal 61 has a higher voltage level than that of the reference signal 63, only the switching transistor 52 is bought into ON status, which allows only the current determined by the constant-current circuit 50 to be supplied to the transistor 56 on the output side; (3) for the case where only the overshoot current adjustment signal 62 has a higher voltage level than that of the reference signal 63, only the switching transistor 53 is bought into ON status, which allows only the current determined by the constant-current circuit 51 to be supplied to the transistor 56 on the output side; and (4) for the case where both of the overshoot current adjustment signals 61, 62 have lower voltage levels than that of the reference signal 63, both switching transistors 52, 53 are brought into OFF status and no current will be supplied to the transistor 56 on the output side.

The overshoot current generating section 8 is a circuit block responsible for generating the overshoot current for instantaneously increasing the write current when the switching section 6 changes the direction of magnetization.

The overshoot current generating section 8 has two parallel lines of switching transistors 64, 65 to which the overshoot current generation signals 43, 44 are connected, and resistors 66, 67 and capacitors 68, 69 respectively connected to the switching transistors 64, 65.

The overshoot current generating section 8 is designed to supply the overshoot current generation signals 43, 44 to the capacitors 68, 69 to thereby obtain overshoot current corresponding to voltage changes in such overshoot current generation signals 43, 44, and to output the obtained overshoot current from the capacitors 68, 69 towards the write current generating section 4.

The write driver circuit 1 for driving a magnetic head configured as described in the above can operate as described in the next paragraphs based on the write driver control signals 9, 10.

In the case where one driver control signal 9 has a higher voltage level than that of another write driver signal 10, the switching transistor 47 is brought into ON status by the overshoot current generation control signal 19 so that the switching transistor 47 and resistor 45 will have flowing therein the current $I_1$ determined by the variable-current circuit 49. As a consequence voltage of the overshoot current generation signal 43 varies from source voltage $V_{CC}$ down to voltage $V_1$ which is lower by a value equivalent to the voltage drop ascribable to the resistor 45 ($R_1 \times I_1$, where $R_1$ is the resistivity of the resistor 45). This makes a potential at point "b" in the overshoot current generation signal producing section 7 sufficiently higher than that at point "a", the overshoot current generation signal 44 brings the switching transistor 65 into ON status, which applies bias voltage to the resistor 67 and instantaneously supplies the overshoot current $I_2$ to the capacitor 69, and allows the overshoot current $I_2$ to be superposed onto the current mirror circuit 23 in the write current generating section 4.

In addition, the switching transistor 25 is brought into ON status by the write current generation control signal 16, which makes the current $I_3$ determined by the constant-current circuit 21 flow in the transistor 28 on the input side of the current mirror circuit 23. As a consequence, the transistor 29 on the output side of the current mirror circuit 23 will have flowing therein the write current $I_5$ which is a summation of the current $I_4$, obtained from the current $I_3$ flowing in the transistor 28 on the input side after being amplified by the current mirror circuit 23, and the overshoot current $I_2$ coming from the capacitor 69 in the overshoot current generating section 8.

Since the switching transistor 38 is brought into ON status by the switching control signal 17, and the switching signal 35 has a higher voltage level, the switching transistor 42 supplied with such switching signal 35 is brought into ON status.

This allows the write current $I_5$ for normal rotation generated by the write current generating section 4 to flow between the connection terminals 32, 33 connected to the magnetic head 2.

On the other hand, for the case where one driver control signal 9 has a lower voltage level than that of another write driver signal 10, the switching transistor 48 is brought into ON status by the overshoot current generation control signal 20 so that the switching transistor 48 and resistor 46 will have flowing therein the current $I_1$ determined by the variable-current circuit 49. As a consequence, voltage of the overshoot current generation signal 44 varies from source voltage $V_{CC}$ down to voltage $V_2$ which is lower by a value equivalent to the voltage drop ascribable to the resistor 46 ($R_2 \times I_1$, where $R_2$ is the resistivity of the resistor 46). This makes a potential at point "a" in the overshoot current generation signal producing section 7 sufficiently higher than that at point "b", the overshoot current generation signal 43 brings the switching transistor 64 into ON status, which applies bias voltage to the resistor 66 and instantaneously supplies the overshoot current $I_6$ to the capacitor 68, and allows the overshoot current $I_6$ to be superposed onto the current mirror circuit 22 in the write current generating section 4.

In addition, the switching transistor 24 is brought into ON status by the write current generation control signal 15, which makes the current $I_3$ determined by the constant-current circuit 21 flow in the transistor 26 on the input side of the current mirror circuit 22. As a consequence, the transistor 27 on the output side of the current mirror circuit 22 will have flowing therein the write current $I_7$ which is a summation of the current $I_4$, obtained from the current $I_3$ flowing in the transistor 26 on the input side after being amplified by the current mirror circuit 22, and the overshoot current $I_6$ coming from the capacitor 68 in the overshoot current generating section 8.

Since the switching transistor 39 is brought into ON status by the switching control signal 18, and the switching signal 34 has a higher voltage level, the switching transistor 41 supplied with such switching signal 34 is brought into ON status.

This allows the write current $I_7$ for reverse rotation generated by the write current generating section 4 to flow between the connection terminals 32, 33 connected to the magnetic head 2.

Figure 3:
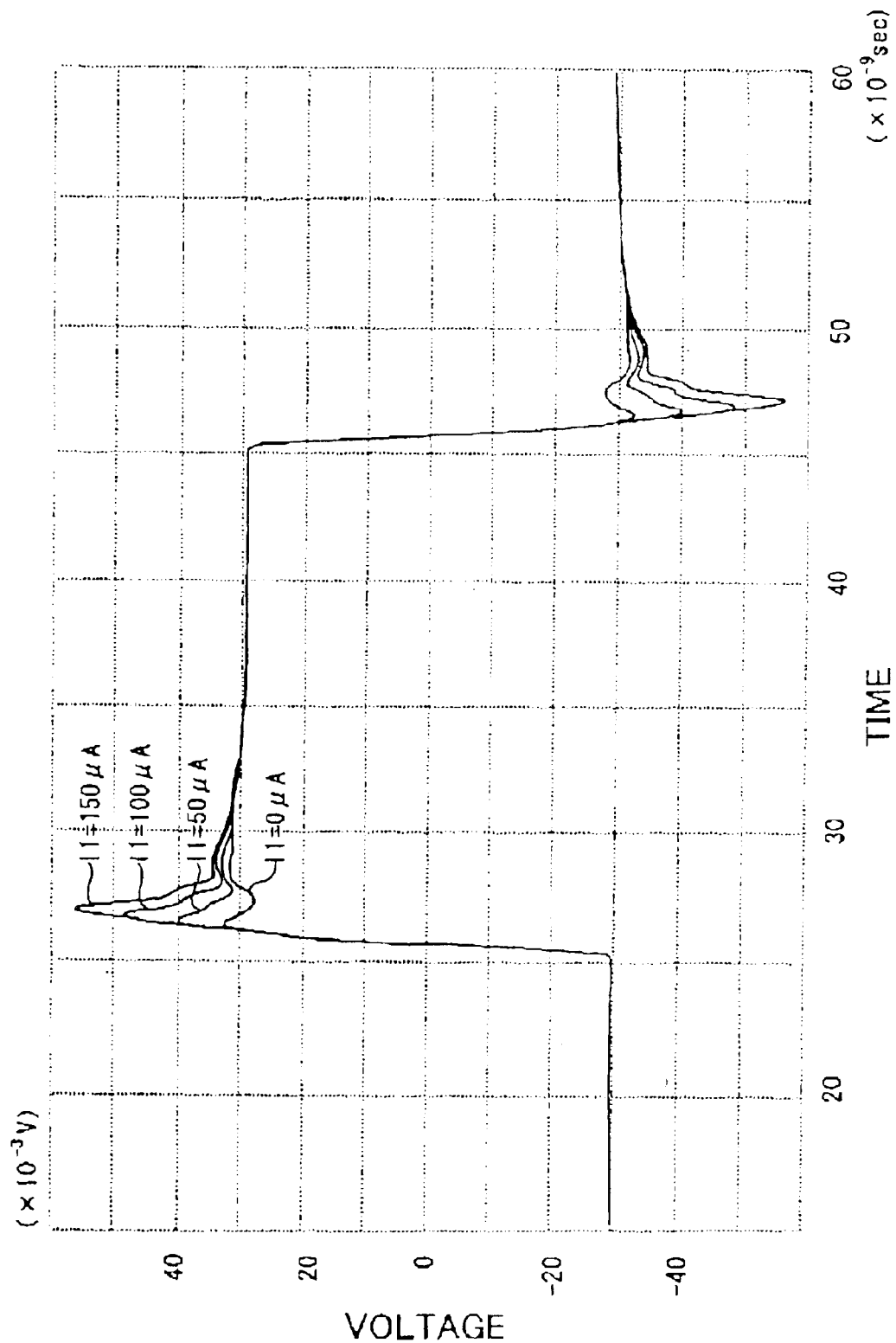
FIG. 3 is a graph for explaining simulation results of write currents.
Figure 4:
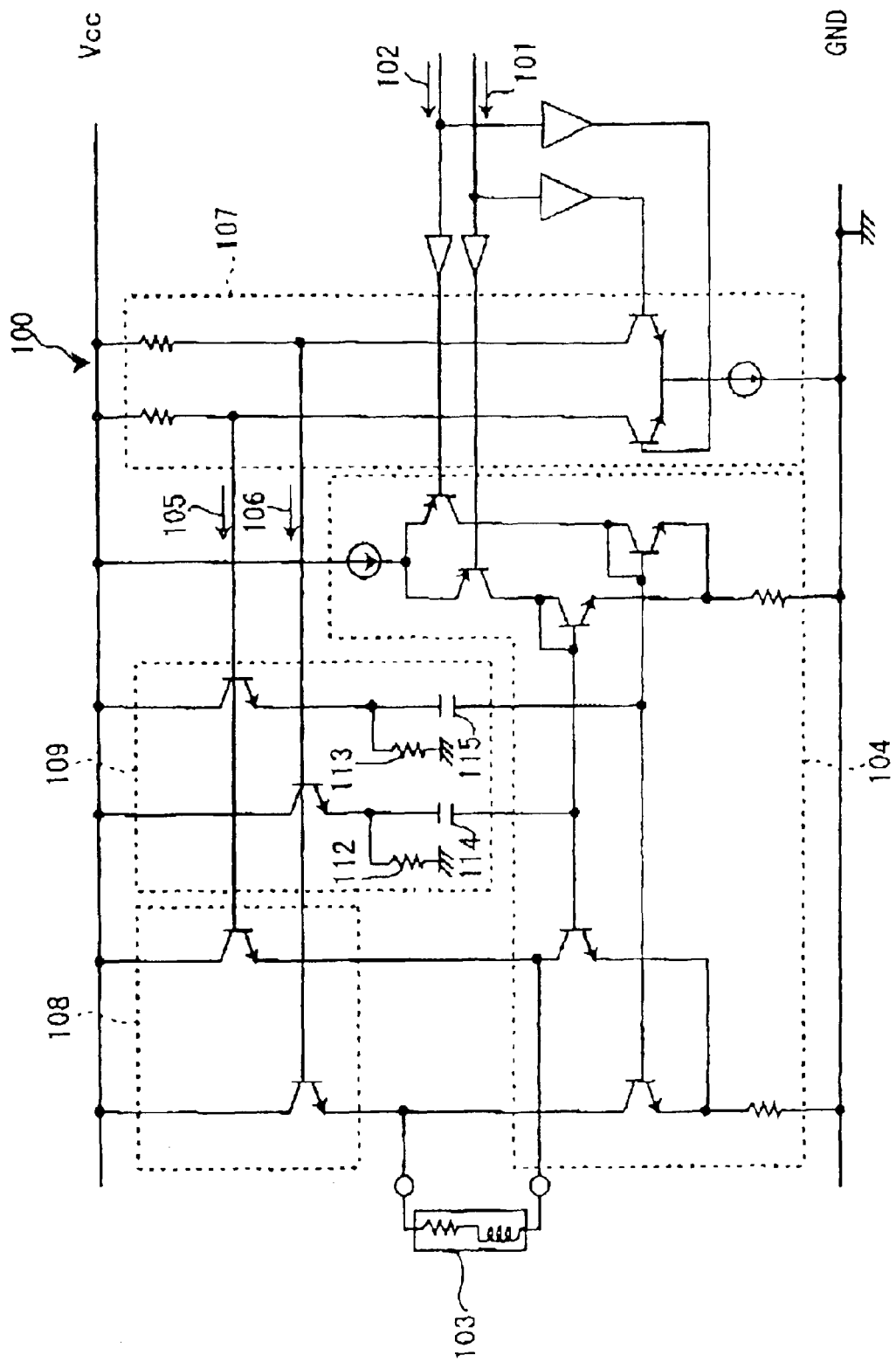
FIG. 4 is a circuit diagram of a conventional write driver circuit for driving a magnetic head.

As described in the above, the overshoot current can be increased or decreased by controlling the voltage of the overshoot current generation signal, and the write current thus can be increased or decreased along with such increase or decrease in the overshoot current. Simulated results of the status of this process observed using a circuit simulator are shown in FIG. 3. The graph shows write currents generated when the supply current $I_1$ was adjusted to four levels of 0 $\mu A$, 50 $\mu A$, 100 $\mu A$ and 150 $\mu A$ using the variable-current circuit 49 so as to control the voltage of the overshoot current generation signal. It is found that the voltage of the overshoot current generation signal increases as the supply current $I_1$ to the variable-current circuit 49 increases, which is associated by an increase in the overshoot current, and that, as a consequence, the write current immediately after the start of the magnetization is instantaneously increased by this increment of the overshoot current.

As has been described above, since the write driver circuit 1 for driving a magnetic head according to the present invention is configured so as to generate the overshoot current based on the overshoot current generation signals 43, 44, which are provided separately from the switching signals 34, 35 of the switching section 6, the voltage variable range of the overshoot current generation signals 43, 44, which serves as a reference for generating the overshoot current, can be liberated from being restricted by the circuit configuration of the switching section 6. This expands the flexibility of such voltage variable range of the overshoot current generation signal 43, 44, and thus makes it possible to provide a write driver circuit for magnetic heads which is conveniently applicable to a variety of magnetic heads or magnetic storage media.

Since the write driver circuit 1 for driving a magnetic head according to the present invention is also configured so as to increase or decrease the overshoot current by controlling the voltage of the overshoot current generation signals 43, 44, only a simple circuit configuration is needed for precisely increasing or decreasing the overshoot current. This makes it possible to provide a write driver circuit for driving a magnetic head which is conveniently applicable to a variety of magnetic heads or magnetic storage media without causing any dimensional expansion of the semiconductor devices or increasing production costs.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A write driver circuit for driving a magnetic head comprising:
    a write current generating section for generating plural types of write current to magnetize through a magnetic head a predetermined area of a magnetic storage medium in a predetermined direction;
    a switching signal generating section for generating a switching signal for switching among said plural types of write current generated by said write current generating section;
    a switching section for changing the direction of magnetization through said magnetic head by switching among said plural types of write current based on said switching signals generated by said switching signal generating section; and
    an overshoot current generating section for generating an overshoot current for instantaneously increasing said write current when the direction of magnetization is changed by said switching section;
    wherein said write driver circuit for driving a magnetic head further comprises an overshoot current generation signal producing section in addition to said switching signal generating section;
    said overshoot current is generated based on an overshoot current generation signal produced by said overshoot current generation signal producing section; and
    said overshoot current generation signal is produced separate from the generation of said switching signal.

2. The write driver circuit for driving a magnetic head as claimed in claim 1, wherein said overshoot current generation signal producing section is configured so as to control voltage of said overshoot current generation signal in order to increase or decrease said overshoot current.

3. The write driver circuit for driving a magnetic head as claimed in claim 2, wherein said overshoot current generation signal producing section is capable of producing at least four differing levels of overshoot current generation signals.

4. The write driver circuit for driving a magnetic head as claimed in claim 2, wherein said overshoot current generation signal producing section comprises a variable current circuit for controlling said voltage of said overshoot current generation signal.

5. The write driver circuit for driving a magnetic head as claimed in claim 4, wherein said variable current circuit comprises:
    a plurality of constant current circuits arranged in parallel;
    a plurality of switching transistors individually connected to said plurality of constant current circuits; and
    a current mirror circuit connected to the outputs of said plurality of switching transistors.

6. A hard disk apparatus including a write driver circuit for driving a magnetic head, said write driver circuit for driving a magnetic head comprising:
    a write current generating section for generating plural types of write current to magnetize through a magnetic head a predetermined area of a magnetic storage medium in a predetermined direction;
    a switching signal generating section for generating a switching signal for switching among said plural types of write current generated by said write current generating section;
    a switching section for changing the direction of magnetization through said magnetic head by switching among said plural types of write current based on said switching signals generated by said switching signal generating section; and
    an overshoot current generating section for generating an overshoot current for instantaneously increasing said write current when the direction of magnetization is changed by said switching section;
    wherein said write driver circuit for driving a magnetic head further comprises an overshoot current generation signal producing section in addition to said switching signal generating section;
    said overshoot current is generated based on an overshoot current generation signal produced by said overshoot current generation signal producing section; and
    said overshoot current generation signal is produced separate from the generation of said switching signal.

7. The hard disk apparatus as claimed in claim 6, wherein said overshoot current generation signal producing section is configured so as to control voltage of said overshoot current generation signal in order to increase or decrease said overshoot current.

8. The hard disk apparatus as claimed in claim 7, wherein said overshoot current generation signal producing section is capable of producing at least four differing levels of overshoot current generation signals.

9. The hard disk apparatus as claimed in claim 7, wherein said overshoot current generation signal producing section comprises a variable current circuit for controlling said voltage of said overshoot current generation signal.

10. The hard disk apparatus as claimed in claim 9, wherein said variable current circuit comprises:
    a plurality of constant current circuits arranged in parallel;
    a plurality of switching transistors individually connected to said plurality of constant current circuits; and
    a current mirror circuit connected to the outputs of said plurality of switching transistors.

* * * * *